Sept. 14, 1965  R. T. CASE  3,205,695
ANVIL PROVIDING RIVET HOLDING CLAMP
Filed Jan. 2, 1964
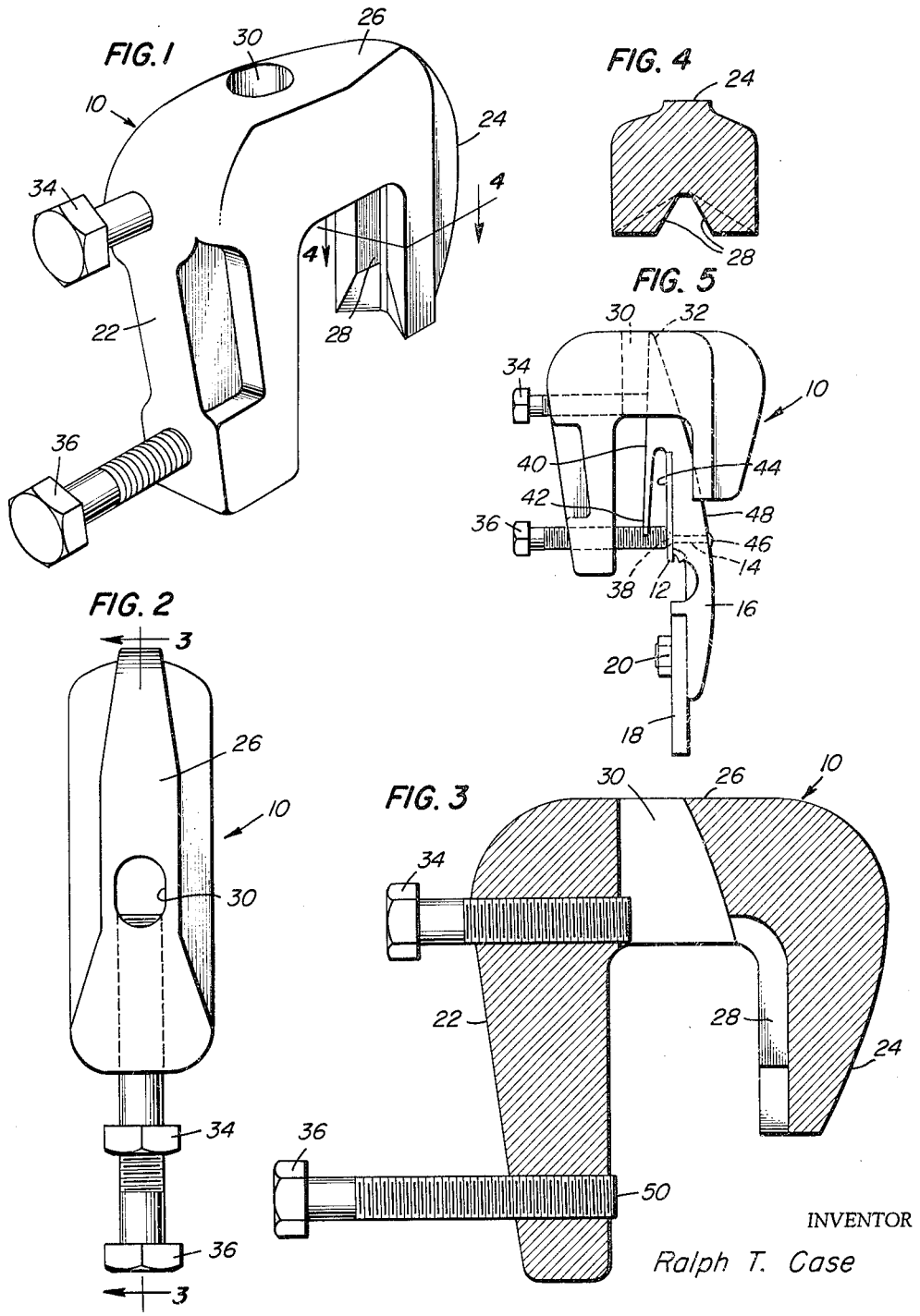
INVENTOR
Ralph T. Case United States Patent Office 3,205,695
Patented Sept. 14, 1965

3,205,695
ANVIL PROVIDING RIVET HOLDING CLAMP
Ralph T. Case, P.O. Box 174, Anselmo, Nebr.
Filed Jan. 2, 1964, Ser. No. 335,185
4 Claims. (Cl. 72—457)

This invention relates to a clamp for holding a rivet in place and for providing an anvil while an end of the rivet is being hammered to rivet it over and hold two articles together.

A further object of this invention is to provide a clamp which will hold itself and a first article together, and which will also hold a second article to the first article, and simultaneously hold a rivet in place through both the second and the first articles and act as an anvil while the extending end of the rivet is hammered over to secure both articles together.

A further object of this invention is more particularly to provide a clamp for holding a ledger plate or sickle cooperating blade in position on a mowing machine guard while the guard is in situ on the mowing machine, and for providing an anvil surface for one end of a rivet extending through both the ledger plate and the guard while the other end of the rivet is being hammered over or riveted to secure the plate in position, thus eliminating the usual necessity of removing the guard from the machine for replacing the ledger plate.

A further object of this invention is to provide a riveting clamp which may be secured to the mowing guard of a mowing machine without the usual necessity of removing the guard from the machine, and then may hold a rivet in place through a ledger plate to be secured to the guard so that one end of the rivet may be hammered over to hold the rivet, and thus secure the ledger plate to the guard, thus making it possible to replace the ledger plate at any time, in the field or elsewhere, in a minimum of time and effort.

With the above and related objects in view, this invention consists in the details of construction and combination of parts, as will be more fully understood from the following description, when read in conjunction with the accompanying drawing, in which:

FIG. 1 is a perspective view of the clamp of this invention.

FIG. 2 is an end elevation of FIG. 1.

FIG. 3 is a sectional view on line 3—3 of FIG. 2.

FIG. 4 is a sectional view on line 4—4 of FIG. 1.

FIG. 5 is a side elevation, on a reduced scale, of the invention in operative position.

There is shown at 10 the clamp of this invention. This clamp 10 is intended for the purpose of enabling a conventional ledger plate or sickle cooperating blade 12 to be secured by means of a rivet 14 to a mowing machine guard 16. With this clamp 10 of this invention, the plate 12 can be replaced on the guard 16 without disturbing the guard holding bolt 20 and without removing the guard 16 from the mowing machine bar 18. Furthermore, the plate 12 may be replaced within the field when necessary, thus keeping down the time to an absolute minimum.

The clamp 10 is a somewhat C-shaped frame, consisting of a long leg 22, a short leg 24, and a connecting bight 26, the legs 22 and 24 extending in a parallel direction from opposite ends of the bight 26. The surface 28 of the short leg that confronts the long leg 24 is grooved or slotted complementary to the back surface 48 of the conventional mowing machine guard 16, and this slotted surface 28 extends into and terminates in an opening 30 into which the guard point 32 may extend.

A bolt 34 is threaded through the long leg 22 adjacent the bight 26, and even extends partly through the bight opening 30. A somewhat longer bolt 36 is also threaded through the long leg 22, in parallel spaced apart relation to said first bolt 34, the spaced relationship being such that it extends beyond the end of the short leg 24, and in addition, is in definite relationship to the length and parts of the mowing machine guard 16, and the location of the rivet opening therethrough for receiving the rivet 14.

In operation, this clamp 10 first clamps or secures itself in position on the mowing machine guard 16 while the guard 16 remains in its customary position on the bar 18 of the mowing machine to which it is held in the usual manner by the bolt 20. Prior to this invention, when a ledger plate 12 needed replacement, it was necessary to remove the guard 16 by first removing the bolt 20, then to take the guard 16 to a work or machine shop, to place the guard 16 in a vise to hold it while inserting a new rivet 14 and then riveting it in place, and then returning the guard 16 to the mowing machine, whereupon the bolt 20 is then placed to hold it. This, of course, idles the mowing machine while the ledger plate 12 was being replaced. With this invention, a considerable saving in time and labor results. The old rivet 14 is first removed, if still in place, by knocking it out by a tool point placed against the riveted end and struck with a hammer in a conventional manner, and the old ledger plate 12 is removed. Then a new ledger plate 12 is put in position, and a new rivet 14 is inserted, first through the ledger plate 12 and then through the aligned opening in the guard 16, until the rivet head 38 is countersunk within the ledger plate 12 as shown, and its other end extends through the back 48 of the guard 16 a sufficient amount to be riveted over.

The clamp 10 is then placed over the pointed end 32 of the guard 16 to the position shown in FIG. 5, the bolts 34 and 36 being sufficiently retracted to permit this. Bolts 34 and 36 are both tightened. The bolt 34 abuts a surface 40 of the guard 16 which is opposite from the back surface of the guard 16. This positively secures the clamp 10 to the guard 16. Extending integrally from this surface 40 in the conventional guard 16 is a conventional somewhat bifurcated arm 42 and the other bolt 36, when tightened, passes through the bifurcation in the arm 42 to abut the head 38 of rivet 14 as well as the surrounding area of the ledger plate 12, thus forcing the ledger plate 12 tightly against the surface 44 of the guard 16. This surface 44, while not the same as the surface 40, is still opposite the back surface 48 of the guard 16. The end 50 of bolt 36 also acts as an anvil to hold the rivet head 38 in position, with the opposite end of rivet 14 extending somewhat beyond the back surface 48 of guard 16. This extending end of the rivet 14 is then hammered over at 46 with a conventional hammer, the end 50 of bolt 36 acting as an anvil while this end is being hammered over at 46. Next, both bolts 34 and 36 are retracted, and the mowing machine may then continue in use without much loss of time.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A clamp for holding a first article while a second article is placed against a portion of a surface of the first article for securement thereto, said clamp comprising a long leg, a short leg and a bight connecting said legs together, said legs extending in substantially the same parallel direction from said bight, said short leg having its surface that confronts the long leg complementary to one surface of the first article, a bolt threaded transversely through said long leg adjacent said bight toward said short leg and adapted to abut an opposite surface of the first article to secure said clamp and said first article together, a second bolt threaded through said long leg in spaced relation to said first bolt, said second bolt being adapted to abut the head of a rivet extending through aligned rivet receiving apertures in the second and first articles and provide an anvil for the rivet while its opposite end, located beyond the end of said short leg, is being hammered to rivet it to hold the first and second articles together.

2. The clamp of claim 1, said complementary surface of said short leg extending into and terminating in an opening in said bight.

3. A riveting clamp for providing an anvil in situs for a ledger plate holding rivet extending through a mowing machine guard, said clamp comprising a somewhat C-shaped frame, said frame comprising a long leg, a short leg, and a bight from the ends of which said legs integrally extend in the same parallel direction, said short leg having a slot complementary to the back of the mowing machine guard, a bolt threaded through said long leg toward said short leg adjacent said bight and adapted to clamp a machine guard with the back of the mowing machine guard against said complementary slot in said short leg, and a second bolt threaded through said long leg adjacent the end away from said bight and beyond the end of said short leg, said second bolt being adapted to contact and hold a rivet through aligned apertures in the ledger plate and the mowing machine guard beyond the end of said short leg and provide an anvil for the contacted rivet end, thereby holding the rivet and ledger plate in position on the mowing machine guard while the opposite end of the rivet is being hammered to rivet it over to ledger plate securing position.

4. The clamp of claim 3, said complementary slot terminating in an opening in said bight.

References Cited by the Examiner

UNITED STATES PATENTS

| | | | |
|---|---|---|---|
| 1,248,355 | 11/17 | Lyle | 78—6 |
| 2,164,283 | 6/39 | Mulvaney | 78—6 |
| 2,747,362 | 5/56 | Cox | 59—7 |

References Cited by the Applicant

UNITED STATES PATENTS

| | | |
|---|---|---|
| 1,587,820 | 6/26 | Carter. |
| 2,114,227 | 4/38 | Kriss. |
| 2,316,073 | 4/43 | Kellogg. |
| 2,903,929 | 9/59 | McVey. |
| 2,952,283 | 9/60 | Chandler. |

CHARLES W. LANHAM, *Primary Examiner.*